(12) United States Patent
Pages

(10) Patent No.: US 10,563,621 B2
(45) Date of Patent: Feb. 18, 2020

(54) SYSTEM FOR SUPPLYING COMPRESSED GAS TO SEVERAL GAS-FED DEVICES

(71) Applicant: CRYOSTAR SAS, Hesingue (FR)

(72) Inventor: Guillaume Pages, Huningue (FR)

(73) Assignee: CRYOSTAR SAS, Hesingue (FR)

( * ) Notice: Subject to any disclaimer, the term of this patent is extended or adjusted under 35 U.S.C. 154(b) by 34 days.

(21) Appl. No.: 16/071,000

(22) PCT Filed: Jan. 9, 2017

(86) PCT No.: PCT/EP2017/050352
§ 371 (c)(1),
(2) Date: Jul. 18, 2018

(87) PCT Pub. No.: WO2017/125276
PCT Pub. Date: Jul. 27, 2017

(65) Prior Publication Data
US 2019/0003425 A1    Jan. 3, 2019

(30) Foreign Application Priority Data
Jan. 18, 2016  (EP) .................................... 16305043

(51) Int. Cl.
*F04B 25/00* (2006.01)
*F04B 15/00* (2006.01)
(Continued)

(52) U.S. Cl.
CPC .... *F02M 21/0245* (2013.01); *F02M 21/0209* (2013.01); *F04B 25/00* (2013.01);
(Continued)

(58) Field of Classification Search
CPC ...................... F02M 21/0245; F02M 21/0209; F04B 41/06; F04B 49/225; F04B 49/065;
(Continued)

(56) References Cited

U.S. PATENT DOCUMENTS 9,447,751 B2    9/2016  Lee et al.
9,739,420 B2 *  8/2017  Lee .......................... B63B 25/16
(Continued)

FOREIGN PATENT DOCUMENTS

EP    2913509 A1    9/2015

OTHER PUBLICATIONS

International Search Report for PCT/EP2017/050352 dated Mar. 27, 2017.

*Primary Examiner* — Thomas N Moulis
(74) *Attorney, Agent, or Firm* — Millen White Zelano & Branigan, PC

(57) ABSTRACT

A system for supplying compressed gas to several gas-fed devices is based on a liquid piston gas multistage compressor (100). Gas pressure measurements performed at a gas intake (10), an intermediate gas outlet (20) and at an end gas outlet (30) of the system allow controlling respective gas capacities of the compressor stages. Easy and reliable control can thus be obtained for the system operation. Varying the number of the compressor stages allows matching any pressure requirements for the gas delivery to all the gas-fed devices, and varying the gas capacities of the compressor stages allows easy adaptation to variable gas consumptions of the gas-fed devices.

17 Claims, 4 Drawing Sheets

(51) Int. Cl.
*F02M 21/02* (2006.01)
*F04B 39/00* (2006.01)
*F25J 1/00* (2006.01)
*F25J 1/02* (2006.01)
*F04B 41/06* (2006.01)
*F04B 39/06* (2006.01)
*F04B 49/06* (2006.01)
*F04B 49/22* (2006.01)
*F04B 15/08* (2006.01)

(52) U.S. Cl.
CPC .......... *F04B 39/0011* (2013.01); *F04B 39/06* (2013.01); *F04B 41/06* (2013.01); *F04B 49/065* (2013.01); *F04B 49/225* (2013.01); *F25J 1/0025* (2013.01); *F25J 1/027* (2013.01); *F25J 1/0244* (2013.01); *F04B 15/08* (2013.01); *F04B 2015/081* (2013.01); *F25J 2230/08* (2013.01); *F25J 2230/22* (2013.01); *F25J 2230/24* (2013.01); *F25J 2230/60* (2013.01)

(58) Field of Classification Search
CPC ...... F04B 39/06; F04B 25/00; F04B 39/0011; F04B 15/08; F04B 2015/081; F25J 1/027; F25J 1/0244; F25J 1/0025; F25J 2230/60; F25J 2230/24; F25J 2230/22; F25J 2230/08
See application file for complete search history.

(56) References Cited

U.S. PATENT DOCUMENTS

| | | |
|---|---|---|
| 2003/0039554 A1 | 2/2003 | Krasnov |
| 2010/0122551 A1* | 5/2010 | Roberts ................ F25J 1/0022 62/613 |
| 2013/0118362 A1 | 5/2013 | Adler et al. |
| 2013/0294938 A1* | 11/2013 | Worden ................ F04B 25/00 417/53 |
| 2013/0323087 A1 | 12/2013 | Heuer et al. |
| 2015/0285189 A1 | 10/2015 | Lee et al. |
| 2017/0268498 A1* | 9/2017 | Kasahara ............... F04B 49/24 |

* cited by examiner

SYSTEM FOR SUPPLYING COMPRESSED GAS TO SEVERAL GAS-FED DEVICES

The invention relates to a system for supplying compressed gas to several gas-fed devices. It also relates to a gas-fuelled vessel which is equipped with such system.

BACKGROUND OF THE INVENTION

Systems for supplying compressed gas, also called gas compressors, which are based on liquid pistons, are well-known. Such system may comprise:
- a gas intake for connection to a gas source;
- an end gas outlet for connection to a gas-fed device;
- a liquid piston gas multistage compressor which comprises at least two compressor stages connected serially in an ordered chain between the gas intake and the end gas outlet.

Each compressor stage comprises at least one cylinder which is supplied with driving liquid, and comprises also a liquid high-pressure supply device which is arranged for alternately increasing and decreasing a driving liquid quantity contained within the cylinder, so as to load, compress and discharge gas at the compressor stage. Each compressor stage other than the first one in the chain, and called higher compressor stage, is connected to process gas which is outputted by a preceding compressor stage situated in the chain just before the higher compressor stage, through an intermediate gas duct which connects the preceding compressor stage to the higher compressor stage. In this way, gas flowing from the gas intake is pressure-increased each time it is processed by one of the compressor stages, and gas which is outputted at the end gas outlet has been processed successively by all the compressor stages of the chain. The advantages of such gas compressors are explained in the book entitled "Hydraulically Driven Pumps" by Donald H. Newhall, Harwood Engineering Co., Inc., Walpole, Mass., reprinted from Industrial and Engineering Chemistry, vol. 49, No. 12, December 1957, pp. 1949-54.

Gas compressors in general have numerous applications in many technical fields, including gas-fuelled engines or hybrid fuel engines, and also gas liquefaction systems. In particular, these applications for gas-fuelled or hybrid fuel engines and gas liquefaction systems may be implemented on-board gas-fuelled vessels, for example liquefied natural gas carrier vessels, as taught in particular by EP 2 913 509 and EP 2 913 510. But for such applications so far, the gas compressors belong to the technology of so-called reciprocating pumps. This latter technology is based on solid pistons which are driven by a rotating motor through a camshaft—or crank—. But such solid piston gas compressors have drawbacks including those recited in the prior art book "Hydraulically Driven Pumps" cited above, which lead to overhaul requirements which are expensive and cause losses in the operating time of the compressors.

Starting from this situation, one object of the present invention consists in providing systems which can supply compressed gas to at least two separate gas-fed devices, with different pressure values for delivering the compressed gas to these devices. Then, an additional object is to provide such system which can be easily adapted as a function of the gas pressure requirements of the devices, without substantially modifying the system design.

Another object of the invention consists in providing an operation control for such system which is easy and reliable, and can sustain gas consumption by the gas-fed devices over wide consumption ranges.

SUMMARY OF THE INVENTION

For meeting at least one of these objects or others, a first aspect of the present invention proposes a system for supplying compressed gas to several gas-fed devices, which comprises a gas intake for connection to a gas source, an end gas outlet for connection to a first gas-fed device, and a liquid piston gas multistage compressor as described above. According to the invention, the system further comprises:
- an intermediate gas outlet arranged in one of the intermediate gas ducts connecting two compressor stages which are successive in the chain, this intermediate gas outlet being intended for connection to a second gas-fed device through an adjustable draw-off valve; and
- a first pressure sensor which is arranged for sensing gas pressure at the gas intake, a second pressure sensor which is arranged for sensing gas pressure at the intermediate gas outlet upstream the draw-off valve with respect to the gas flow direction in the intermediate gas outlet, and a third pressure sensor which is arranged for sensing gas pressure at the end gas outlet.

According to an additional feature of the invention, the liquid high-pressure supply device of the first compressor stage of the chain comprises first regulation means which are arranged for varying a gas capacity of the first compressor stage based on first measurement results issued by the first pressure sensor.

According to another feature of the invention, second regulation means are arranged for adjusting the draw-off valve based on second measurement results which are issued by the second pressure sensor.

According to still another feature of the invention, the liquid high-pressure supply system of the last compressor stage in the chain comprises third regulation means which are arranged for varying another gas capacity of the last compressor stage based on third measurement results issued by the third pressure sensor.

Because the invention system implements a gas compressor which is based on liquid pistons, varying the number of compressor stages in the chain allows matching wide ranges of pressure requirements for the gas deliveries to the gas-fed devices. In particular, the compressor stages may share one same source of high-pressure driving liquid, connected in parallel to the liquid high-pressure supply systems of several or all compressor stages. Modifying the compressor stage number can then be performed at minimum cost.

Implementing a gas compressor which is based on liquid pistons also allows matching wide ranges for the gas consumptions of the devices by adjusting easily the gas capacities of the compressor stages.

Drawbacks of the reciprocating pumps are avoided by implementing the liquid piston gas compressor.

Also the invention provides an operation control of the system which is based on pressure measurements. Such control can be performed in a simple and reliable manner, using sensors which are widely available at reasonable cost.

In some implementations of the invention, the chain may comprise between two and six compressor stages, including two and six values, within the liquid piston gas multistage compressor. In such configurations, at least two compressor stages of the liquid piston gas multistage compressor may be situated in the chain between the gas intake and the intermediate gas outlet, and called first segment compressor stages. The liquid high-pressure supply device of each one of these first segment compressor stages may then comprise respective regulation means which are arranged for varying respective gas capacities of the first segment compressor stages, based on the first measurement results issued by the first pressure sensor.

Similarly, at least two compressor stages of the liquid piston gas multistage compressor may be situated in the chain between the intermediate gas outlet and the end gas outlet, and called last segment compressor stages. Then, the liquid high-pressure supply device of each one of these last segment compressor stages may comprise respective regulation means which are arranged for varying respective gas capacities of the last segment compressor stages, based on the third measurement results issued by the third pressure sensor.

The invention system may be adapted for being on-board a gas-fuelled vessel. Then, one among the intermediate gas outlet and the end gas outlet may be dedicated for connection to a fuel gas intake of a propulsion engine of the vessel. The other gas outlet may be dedicated for connection to a gas burner or a gas liquefaction system.

For such vessel on-board applications, the gas intake of the system may be dedicated to be connected so as to receive boil-off gas originating from liquefied gas which is contained in at least one tank arranged on-board the vessel. This tank thus forms at least part of the gas source.

A second aspect of the invention proposes a gas-fuelled carrier vessel which comprises a propulsion engine and at least one system for supplying compressed gas to several gas-fed devices, said system being in accordance with the first invention aspect. One among the intermediate gas outlet and the end gas outlet of the system may be connected to a fuel gas intake of the vessel propulsion engine.

Generally, the gas processed by a system according to the invention may be methane, ethane, propane, butane and blends thereof, including petroleum gas. It may also be methanol, ethanol or dimethyl ether. All these gases may be used as fuel for engines, for example vessel propulsion engines. The gas-fuelled vessel may be a liquefied gas carrier vessel, in particular a liquefied natural gas carrier vessel.

However, the gas processed by a system according to the invention may also be hydrogen, in particular for feeding a fuel cell device with suitable hydrogen flow.

These and other features of the invention will be now described with reference to the appended figures, which relate to preferred but not-limiting embodiments of the invention.

BRIEF DESCRIPTION OF THE DRAWINGS

Same reference numbers which are indicated in different ones of these figures denote identical elements of elements with identical function.

DETAILED DESCRIPTION OF THE INVENTION

The invention is now described in detail for several embodiment examples, but without inducing any limitation with respect to the claim scope. In particular, natural gas processing and application to liquefied natural gas carrier vessels will be described, but other gases and applications are encompassed as well by the claims, with identical implementation features or gas-adapted implementation features.

Figure 1:
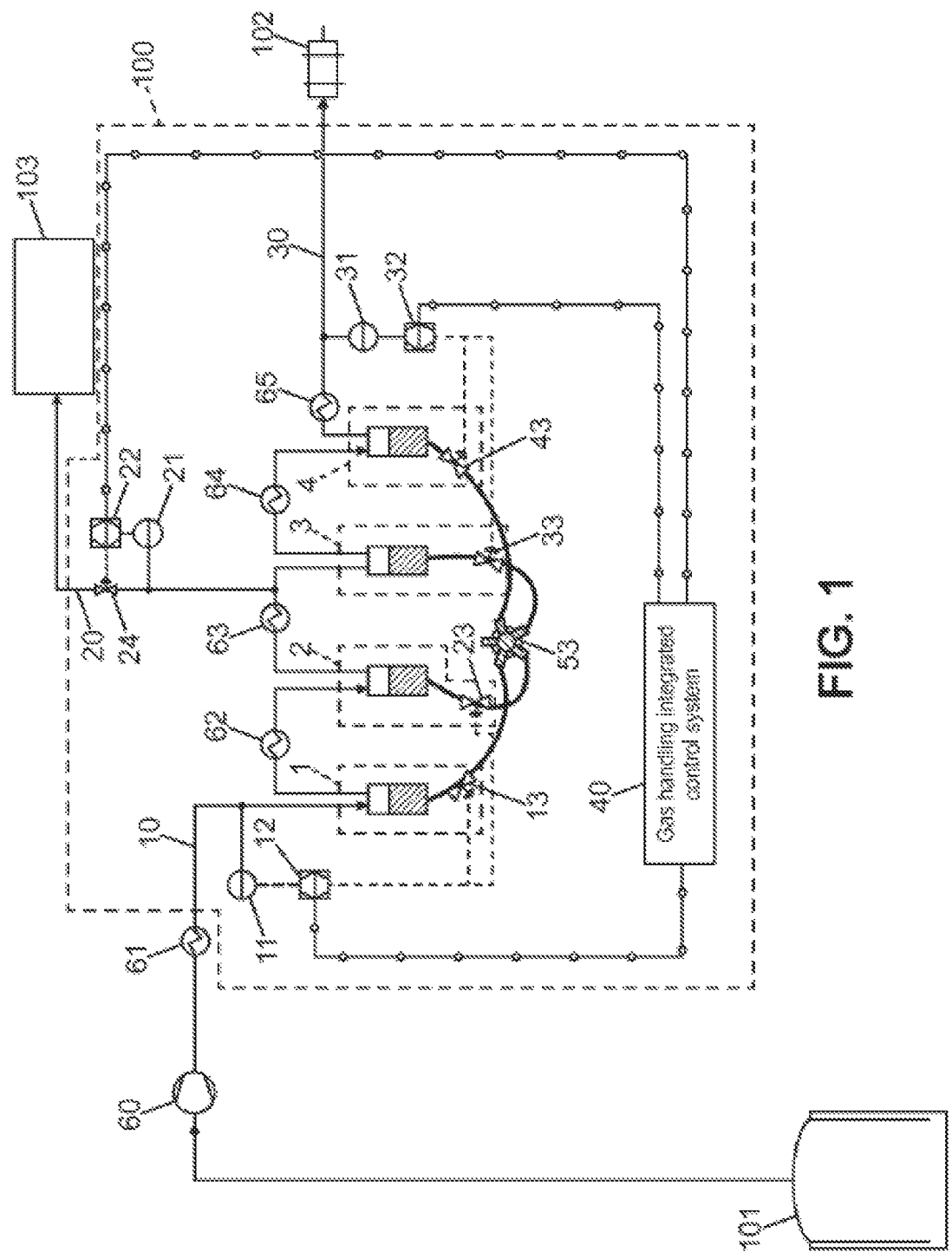
FIGS. 1 to 4 illustrate four possible implementations of the invention.

Referring to FIG. 1, the following reference numbers have the meanings now listed:
101 gas source
102 first gas-fed device
103 second gas-fed device
100 liquid piston gas multistage compressor
1-4 four compressor stages of the liquid piston gas multistage compressor, number four being only for illustration purpose
10 gas intake of the system
20 intermediate gas outlet of the system
30 end gas outlet of the system
11, 21, 31 gas pressure sensors
12, 22, 32 controllers
13, 23, 33, 43 regulation means dedicated to each compressor stage
24 draw-off valve
40 gas handling integrated control system
53 source of high-pressure driving liquid
60 optional pre-compressor
61 optional gas cooler
62-65 intercoolers The gas source 101 may comprise a tank or several tanks (only one tank is represented in the figures) containing liquefied natural gas, from which originates boil-off gas. Such gas tank(s) may be arranged on-board a liquefied natural gas carrier vessel, for example. In such case, the gas which is processed by a system according to the invention may be the boil-off gas, but it may be also vaporized liquid of natural gas, or a combination of boil-off gas and vaporized liquid of natural gas. This gas processed by the invention system may be comprised of more than 80% in-weight of methane.

The gas intake 10 may be connected for receiving the boil-off gas which originates from the liquefied natural gas, or the vaporized liquid of natural gas.

The liquid piston gas multistage compressor 100 comprises the four compressor stages 1-4 which are serially connected in a chain, so that each compressor stage processes gas outputted by the compressor stage just before in the chain, except the compressor stage 1 which processes gas originating from the gas intake 10. In the example represented, compressor stage 1 is the first one in the chain, and compressor stage 4 is the last one in the chain. The compressor stage 4 outputs compressed gas through the end gas outlet 30. Each one of the compressor stages 1-4 comprises a respective sealed cylinder which is connected for admitting a variable amount of driving liquid, and also comprises a liquid high-pressure supply device which varies the amount of driving liquid contained in the cylinder. The structure of such liquid piston compressor stage is well known, so that it is not necessary to repeat it here. It is only indicated that the repeatedly varied level of the driving liquid within each cylinder, increasingly and decreasingly, produces a flow of compressed gas out from the cylinder of the compressor stage considered. This compressed gas flow depends in particular from the magnitude of the level variation of the driving liquid within the cylinder, and also the frequency of this level variation of the driving liquid within the cylinder. In the frame of this description, the phrase "capacity of one of the compressor stages" indicates the average amount, for example the average weight, of compressed gas which is outputted per time unit by the compressor stage. This capacity results in particular from the magnitude and the frequency of the level variations of the driving liquid within the cylinder. The liquid high-pressure supply device of each one of the compressor stages comprises respective regulation means and a source of high-pressure driving liquid. The source of high-pressure driving liquid may be advantageously shared between the compressor stages 1-4, according to reference number 53, and the regulation means are labelled 13 for compressor stage 1, 23 for compressor stage 2, 33 for compressor stage 3, and 43 for compressor stage 4. These regulation means are represented as valves in FIG. 1 only for illustration purpose, but they have complex structure as well-known from the Man skilled in the art. The ratio between output gas pressure and intake gas pressure individually for each compressor stage may be between two and fifteen.

Advantageously within such compressor based on liquid pistons, there is no direct contact between the driving liquid and the gas to compress within each cylinder, for avoiding that the compressed gas is polluted with vapour of the driving liquid or vapours produced by this latter. In particular, document US 2012/0134851 proposes arranging a dummy solid piston between the driving liquid and the gas being compressed. During an operation cycle of the compressor stage, the dummy piston remains on top of the driving liquid within the cylinder, and moves up and down due to the alternating variation in the level of the driving liquid. Dummy pistons within separate cylinders are independent from each other, without solid-based interconnections. A fixed amount of an additional liquid is further provided for producing peripheral sealing between the dummy piston and the inner surface of the cylinder. This amount of additional liquid remains comprised between the peripheral surface of the dummy piston and the inner surface of the cylinder whatever the instant level of the driving liquid by moving together with the dummy piston. This additional liquid is selected for not producing polluting vapours and so that the gas to be compressed does not dissolve into it and does not produce any chemical reaction with it. Liquid of ionic type have been implemented for this purpose, or any other liquid capable of producing the functions of gas-sealing and lubricating.

The gas is conducted from the gas source 101 to the gas intake 10 through a dedicated path which may comprise the pre-compressor 60, and also optionally the gas cooler 61. The pre-compressor 60 may be of rotary type, and adapted for increasing the pressure of the boil-off gas or vaporized gas up to between 4 and 7 bara (bara for absolute pressure expressed in bars).

Also the intercoolers 62-65 may be provided each at one intermediate gas duct between two compressor stages which are successive in the chain, and between the last compressor stage 4 and the end gas outlet 30. Each intercooler cools down the gas which flows within the intermediate gas duct considered or within the end gas outlet 30.

The first gas-fed device 102 is connected to the end gas outlet 30, so as to be fed with compressed gas outputted from the last compressor stage 4. When the invention is implemented on-board a liquefied natural gas carrier vessel, the first gas-fed device 102 may comprise a vessel propulsion engine to be supplied with natural gas only, or a hybrid fuel engine to be supplied with both liquid fuel and natural gas. In this latter case, only the natural gas supply of the vessel propulsion engine is concerned with the present description. So the end gas outlet 30 may be dedicated for connection to the fuel gas intake of the vessel propulsion engine. For some types of this engine, the gas pressure which is required at the end gas outlet 30 may be in the range of 100 bara to 450 bara, in particular between 300 bara and 400 bara. For such pressure range at the end gas outlet 30, implementing the pre-compressor 60 may be preferred or necessary.

The second gas-fed device 103 is connected to the intermediate gas outlet 20 for receiving compressed gas therefrom. The intermediate gas outlet 20 is located at the gas duct between the compressor stages 2 and 3 in the example represented, but it may be intermediate between any two successive ones of the compressor stages 1-4 depending on the gas pressure value which is required at the intake of the second gas-fed device 103. In the first invention implementation of FIG. 1, the second gas-fed device 103 may comprise a burner, for example for getting rid of an excess of boil-off gas.

Figure 2:
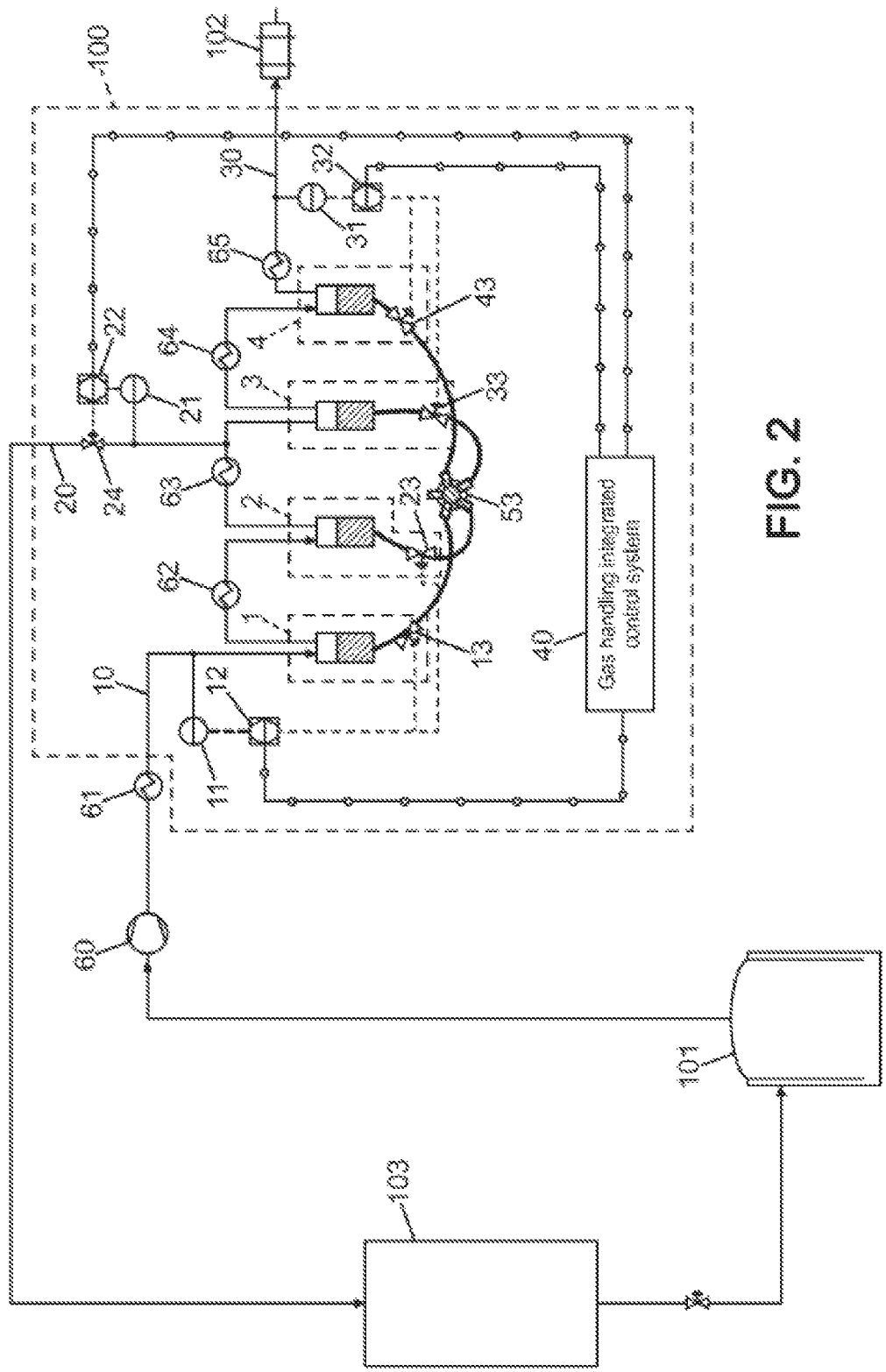

FIG. 2 illustrates a second implementation of the invention also adapted for being on-board a liquefied natural gas carrier vessel, but alternative to that of FIG. 1. In this second implementation, the second gas-fed device 103 may be a gas liquefaction system which is adapted to convert part of the compressed natural gas which originates from the intermediate gas outlet 20 into liquefied natural gas. The liquefied natural gas thus produced may be poured back into the tank(s) of the gas source 101.

More generally, the second gas-fed device 103 may be any other device to be supplied with compressed gas, including an ancillary engine, an electrical generator, etc.

Figure 3:
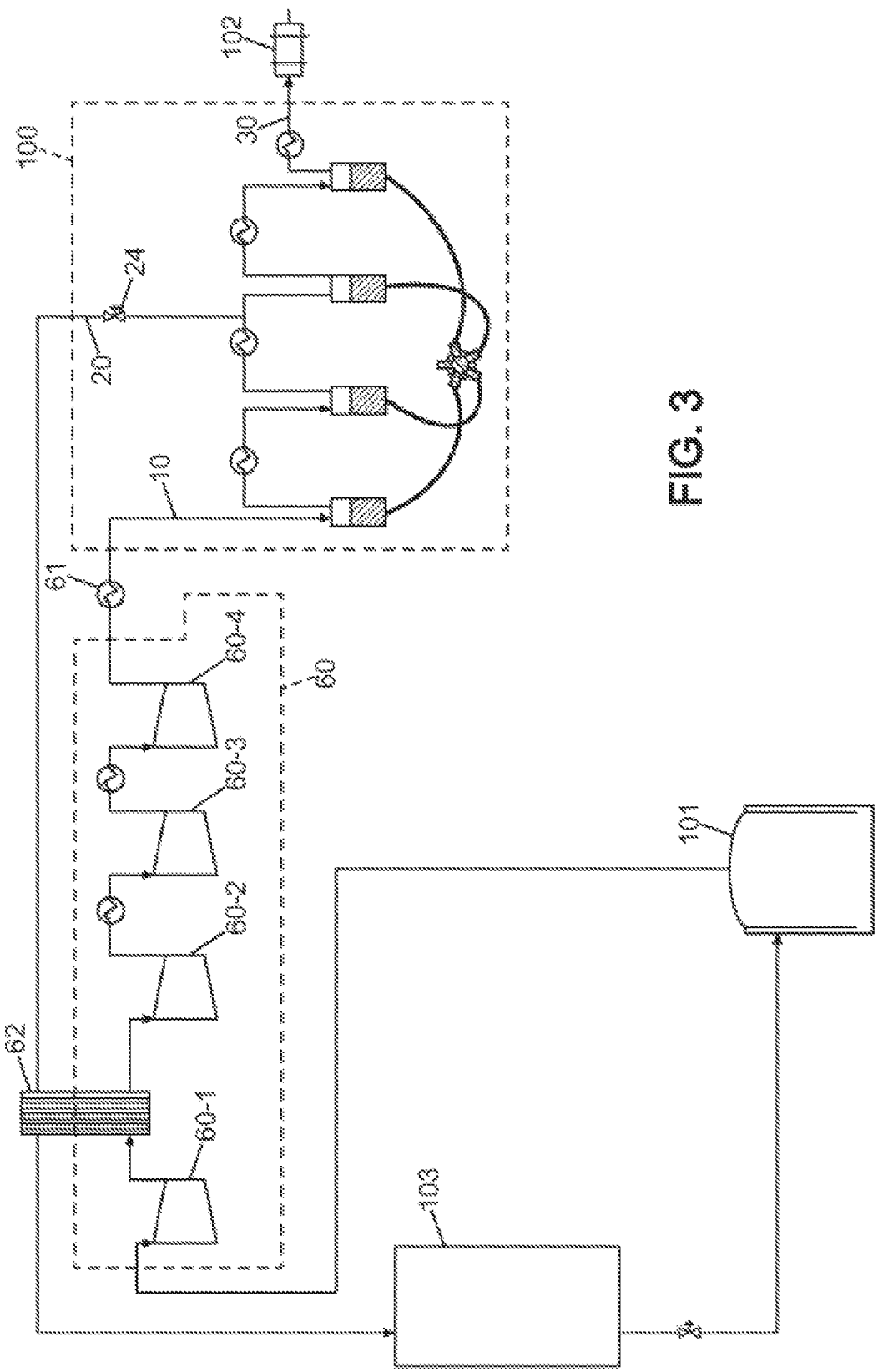

FIG. 3 illustrates a possible variation of the invention implementation of FIG. 2, where the pre-compressor 60 is a multistage rotary gas pre-compressor, for example a four-stage gas pre-compressor with the pre-compressor stages labelled 60-1 to 60-4, respectively. A heat exchanger 62 may be implemented for cooling the compressed gas originating from the intermediate gas outlet 20 before transferring it to the gas liquefaction system 103. Hence, heat from the compressed gas which originates from the intermediate gas outlet 20 is absorbed by the incoming gas between the pre-compressor stages 60-1 and 60-2. Liquefaction yield of the gas liquefaction system may be increased in this way. In FIG. 3, the liquid piston gas multistage compressor 100 may have an internal structure similar to that described with reference to FIG. 1 although all internal components of the liquid piston gas multistage compressor are not represented or labelled in FIG. 3.

According to the invention, the gas intake 10 is provided with the pressure sensor 11 (FIG. 1 or 2). The pressure sensor 11 outputs first pressure measurement results relating to the gas which flows through the gas intake 10. Then, the capacity of the compressor stage 1 is varied based on these first pressure measurement results using the regulation means 13. Possibly, the regulations means 13 may be controlled in this way for maintaining the gas pressure at the gas intake 10 close to a first desired value. Preferably, and for improved consistency of the operation of the compressor stages 1 and 2, the capacity of the compressor stage 2 may also be varied based on the first pressure measurement results using the regulation means 23.

According to the invention again, the intermediate gas outlet 20 is provided with the adjustable draw-off valve 24, and the second gas-fed device 103 is gas-supplied through the draw-off valve 24. The intermediate gas outlet 20 is also provided with the pressure sensor 21 which is connected between the draw-off valve 24 and the gas output of the compressor stage 2. The pressure sensor 21 outputs second pressure measurement results relating to the gas which flows though the intermediate gas outlet 20. Then, the draw-off valve 24 is varied using appropriate regulation means (not represented) based on these second pressure measurement results. Possibly, the draw-off valve 24 may be controlled in this way for maintaining the gas pressure at the intermediate gas outlet 20 close to a second desired value.

Still according to the invention, the end gas outlet 30 is provided with the pressure sensor 31. The pressure sensor 31 outputs third pressure measurement results relating to the gas which flows though the end gas outlet 30. Then, the capacity of the compressor stage 4 is varied based on these third pressure measurement results using the regulation means 43. Possibly, the regulations means 43 may be controlled in this way for maintaining the gas pressure at the end gas outlet 30 close to a third desired value. Preferably, and for improved consistency of the operation of the compressor stages 3 and 4, the capacity of the compressor stage 3 may also be varied based on the third pressure measurement results using the regulation means 33.

According to a possible signal processing design, a first controller, labelled 12, may be connected for receiving a first pressure set-point, and also for receiving the first pressure measurement results from the pressure sensor 11. The first controller 12 may be further connected for transmitting at least one first operating parameter value to the regulation means 13. The first operating parameter may be the variation frequency of the driving liquid level within the cylinder of the compressor stage 1, of its variation magnitude, or a combination of these frequency and magnitude. This first operating parameter thus controls the gas capacity of the compressor stage 1. It is inferred by the first controller 12 from at least one difference between one of the first pressure measurement results and the first pressure set-point. For example, when the gas pressure currently existing at the gas intake 10 is below the first pressure set-point, the capacity of the compressor stage 1 may be reduced. Conversely, the capacity of the compressor stage 1 may be increased when the gas pressure at the gas intake 10 is above the first pressure set-point. Possibly, the first controller 12 may also transmit at least one additional operating parameter value to the regulation means 23, for simultaneously controlling the gas capacity of the compressor stage 2, in a manner consistent with the gas capacity of the compressor stage 1.

A second controller, labelled 22, may be connected for receiving a second pressure set-point, and also for receiving the second pressure measurement results from the pressure sensor 21. This second controller 22 may be further connected for transmitting a second operating parameter value to the regulation means of the draw-off valve 24. The second operating parameter may be a variable aperture value to be produced by the draw-off valve 24. This second operating parameter thus controls a gas flow through the intermediate gas outlet 20 using the draw-off valve 24. It is inferred by the second controller 22 from at least one difference between one of the second pressure measurement results and the second pressure set-point. For example, when the gas pressure currently existing at the intermediate gas outlet 20 is below the second pressure set-point, the aperture of draw-off valve 24 may be reduced. Conversely, the aperture of the draw-off valve 24 may be increased when the gas pressure at the intermediate gas outlet 20 is above the second pressure set-point.

A third controller, labelled 32, may be connected for receiving a third pressure set-point, and also for receiving the third pressure measurement results from the pressure sensor 31. The third controller 32 may be further connected for transmitting at least one third operating parameter value to the regulation means 43. The third operating parameter may be the variation frequency of the driving liquid level within the cylinder of the compressor stage 4, of its variation magnitude, or a combination of these frequency and magnitude. This third operating parameter thus controls the gas capacity of the compressor stage 4. It is inferred by the third controller 32 from at least one difference between one of the third pressure measurement results and the third pressure set-point. For example, when the gas pressure currently existing at the end gas outlet 30 is below the third pressure set-point, the capacity of the compressor stage 4 may be increased. Conversely, the capacity of the compressor stage 4 may be reduced when the gas pressure at the end gas outlet 30 is above the third pressure set-point. Possibly, the third controller 32 may also transmit at least one additional operating parameter value to the regulation means 33, for simultaneously controlling the gas capacity of the compressor stage 3, in a manner consistent with the gas capacity of the compressor stage 4.

The first, second and third controllers 12, 22, 32 may each comprise a proportional-integral-derivative controller.

The first, second and third pressure set-points may be issued by the gas handling integrated control system 40, and sent by this latter to the first, second and third controllers 12, 22, 32, respectively, possibly through dedicated transmission lines.

Figure 4:
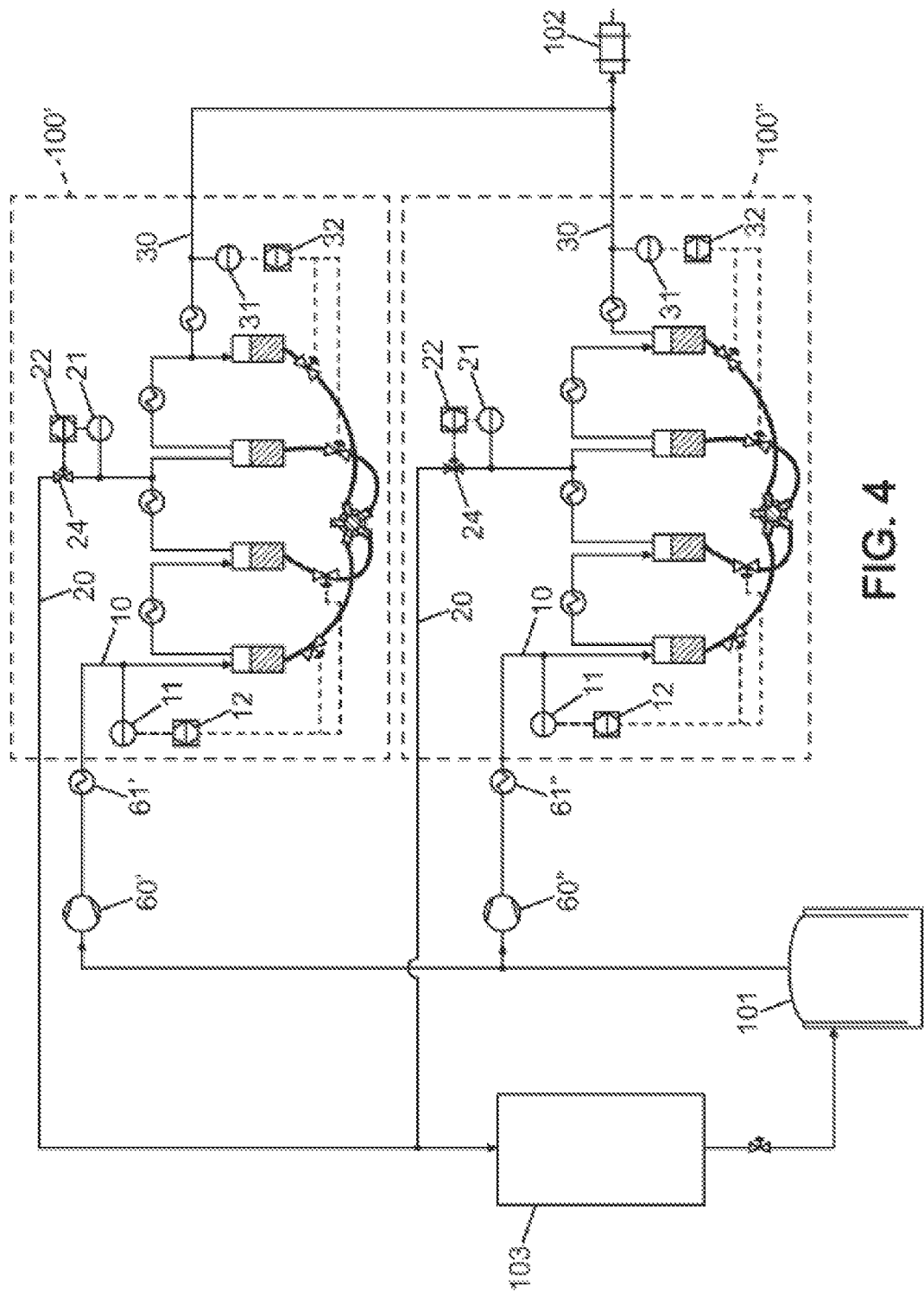

Some applications of gas compressors may require redundancy for systems which are critical to ensure an identified function, continuous operation or for safety reasons. This may be so for natural gas supply on-board a vessel, in particular for supplying fuel gas to the vessel propulsion engine. Thus, a liquefied natural gas carrier vessel may comprise two separate systems for supplying compressed gas to several gas-fed devices, each system implementing the invention. In particular, one among the intermediate gas outlet and the end gas outlet of each system may connected to the fuel gas intake of the vessel propulsion engine, so as to provide redundancy for fuel gas supply to the propulsion engine. FIG. 4 illustrates such redundant equipment for a vessel. Both liquid piston gas multistage compressors 100' and 100" are duct-connected in parallel from the gas source 101. They may be identical or not, but each comprised of the components and arrangement previously described for the liquid piston gas multistage compressor 100 with reference to FIGS. 1 and 2, although all these components are not represented or labelled again in FIG. 4. The end gas outlets 30 of both systems 100' and 100" are connected to the fuel gas intake of the propulsion engine 102, and the intermediate gas outlets 20 of both systems 100' and 100" may be connected to the gas intake of the gas liquefaction system 103 through their respective draw-off valves 24. For complete redundancy, separate pre-compressors 60', 60" and separate gas coolers 61', 61" may be provided on the paths between the gas source 101 and the respective gas intakes 10 of the systems 100' and 100".

For implementations of the invention on-board a liquefied natural gas carrier vessel, it is not compulsory that the fuel gas intake of the vessel propulsion engine is connected to the end gas outlet 30 of the liquid piston gas multistage compressor 100. Alternatively but depending on the gas pressure which is required at the engine intake, the intermediate gas outlet 20 of the liquid piston gas multistage compressor 100 may be dedicated to connection to the fuel gas intake of the vessel propulsion engine. Indeed, a gas pressure value in the range of 6±1.5 bara or 16±4 bara which exists at the intermediate gas outlet 20 of the liquid piston gas multistage compressor 100 may suit for supplying the fuel gas to the vessel propulsion engine. In such case, the vessel propulsion engine forms at least part of the second gas-fed device 103 (FIG. 1). Then, the end gas outlet 30 of the liquid piston gas multistage compressor 100 may be dedicated to supply gas at higher pressure to any other gas-fed device, acting as the first gas-fed device 102. For example, compressed gas at about 40 bara may be supplied to a gas liquefaction system from the end gas outlet 30 of the liquid piston gas multistage compressor 100.

It must be understood that the invention may be reproduced while adapting some implementation details with respect from the description here-above provided with reference to the figures. In particular, the invention may be implemented whatever the number of compressor stages higher than unity within the liquid piston gas multistage compressor, and whatever the position of the intermediate gas outlet along the chain of the compressor stages. Also, the numeral values which have been cited for the gas pressures have only been provided for illustrative purpose.

Also possibly, several intermediate gas outlets may be provided on different intermediate gas ducts along the chain of the compressor stages in the liquid piston gas multistage compressor, for supplying gas to more than two gas-fed devices with respective gas pressure requirements which are all different. Each intermediate gas outlet may then be provided with a respective draw-off valve and pressure sensor for adjustment of this draw-off valve as described earlier in the present text, separately from the other draw-off valves.

The invention claimed is:

1. System for supplying compressed gas to several gas-fed devices, comprising:
    a gas intake (10) for connection to a gas source (101);
    an end gas outlet (30) for connection to a first gas-fed device (102);
    a liquid piston gas multistage compressor (100) which comprises at least two compressor stages (1-4) connected serially in an ordered chain between the gas intake (10) and the end gas outlet (30), each compressor stage comprising at least one cylinder supplied with driving liquid, and also comprising a liquid high-pressure supply device arranged for alternately increasing and decreasing a driving liquid quantity contained within the cylinder, so as to load, compress and discharge gas at the compressor stage, each compressor stage other than the first one in the chain, and called higher compressor stage, being connected to process gas which is outputted by a preceding compressor stage situated in the chain just before said higher compressor stage, through an intermediate gas duct connecting said preceding compressor stage to said higher compressor stage, so that gas flowing from the gas intake is pressure-increased each time it is processed by one of the compressor stages, and gas outputted at the end gas outlet has been processed successively by all the compressor stages of the chain;
    characterized in that it further comprises:
    an intermediate gas outlet (20) arranged in one of the intermediate gas ducts connecting two compressor stages (2, 3) which are successive in the chain, said intermediate gas outlet being intended for connection to a second gas-fed device (103) through an adjustable draw-off valve (24); and
    a first pressure sensor (11) arranged for sensing gas pressure at the gas intake (10), a second pressure sensor (21) arranged for sensing gas pressure at the intermediate gas outlet (20) upstream the draw-off valve (24) with respect to gas flow direction in said intermediate gas outlet, and a third pressure sensor (31) arranged for sensing gas pressure at the end gas outlet (30);
    and in that the liquid high-pressure supply device of a first compressor stage (1) of the chain comprises first regulation means (13) arranged for varying a gas capacity of said first compressor stage based on first measurement results issued by the first pressure sensor (11),
    the system further comprises second regulation means arranged for adjusting the draw-off valve (24) based on second measurement results issued by the second pressure sensor (20), and
    the liquid high-pressure supply system of a last compressor stage (4) in the chain comprises third regulation means (43) arranged for varying another gas capacity of said last compressor stage based on third measurement results issued by the third pressure sensor (31).

2. System according to claim 1, further comprising:
    a first controller (12) connected for receiving a first pressure set-point, and also for receiving the first pressure measurement results from the first pressure sensor (11), and connected for transmitting at least one first operating parameter value to the first regulation means (13), said at least one first operating parameter controlling the gas capacity of the first compressor stage (1) in the chain, and being inferred by the first controller from at least one difference between one of the first pressure measurement results and the first pressure set-point;
    a second controller (22) connected for receiving a second pressure set-point, and also for receiving the second pressure measurement results from the second pressure sensor (21), and connected for transmitting a second operating parameter value to the second regulation means, said second operating parameter controlling a gas flow through the intermediate gas outlet (20) using the draw-off valve (24), and being inferred by the second controller from at least one difference between one of the second pressure measurement results and the second pressure set-point; and
    a third controller (32) connected for receiving a third pressure set-point, and also for receiving the third pressure measurement results from the third pressure sensor (31), and connected for transmitting at least one third operating parameter value to the third regulation means (43), said at least one third operating parameter controlling the gas capacity of the last compressor stage (4) in the chain, and being inferred by the third controller from at least one difference between one of the third pressure measurement results and the third pressure set-point.

3. System according to claim 2, wherein each one of the first (12), second (22) and third (32) controllers comprises a proportional-integral-derivative controller.

4. System according to claim 2, further comprising a gas handling integrated control system (40) adapted for issuing the first, second and third pressure set-points, and transmitting said first, second and third pressure set-points to the first (12), second (22) and third (32) controllers, respectively.

5. System according to claim 1, wherein the chain comprises between two and six compressor stages (1-4), including two and six values, within the liquid piston gas multistage compressor (100).

6. System according to claim 5, wherein at least two compressor stages (1, 2) of the liquid piston gas multistage compressor (100) are situated in the chain between the gas intake (10) and the intermediate gas outlet (20), called first segment compressor stages, and wherein the liquid high-pressure supply device of each one of the first segment compressor stages comprises respective regulation means (12, 23) arranged for varying respective gas capacities of the first segment compressor stages, based on the first measurement results issued by the first pressure sensor (11).

7. System according to claim 5, wherein at least two compressor stages (3, 4) of the liquid piston gas multistage compressor (100) are situated in the chain between the intermediate gas outlet (20) and the end gas outlet (30), called last segment compressor stages, and wherein the liquid high-pressure supply device of each one of the last segment compressor stages comprises respective regulation means (33, 43) arranged for varying respective gas capacities of the last segment compressor stages, based on the third measurement results issued by the third pressure sensor (31).

8. System according to claim 1, further comprising intercooler devices (62-65) each arranged at one intermediate gas duct between two compressor stages (1, 4) which are successive in the chain, and between the last compressor stage (4) of the chain and the end gas outlet (30), for cooling down the gas flowing within said intermediate gas duct or at said end gas outlet.

9. System according to claim 1, adapted for being on-board a gas-fuelled vessel, and wherein one among the intermediate gas outlet (20) and the end gas outlet (30) is dedicated for connection to a fuel gas intake of a propulsion engine of the vessel.

10. System according to claim 9, wherein the intermediate gas outlet (20) or the end gas outlet (30) other than that which is dedicated for connection to the fuel gas intake of the vessel propulsion engine is dedicated for connection to a gas burner or a gas liquefaction system.

11. System according to claim 9, wherein the end gas outlet (30) is dedicated for connection to the fuel gas intake of the vessel propulsion engine, said vessel propulsion engine thus forming at least part of the first gas-fed device (102), and the gas pressure at the end gas outlet is in the range of 100 bara to 450 bara.

12. System according to claim 11, further comprising a pre-compressor (60) arranged on a gas path between the gas intake (10) and the connection to the gas source (101).

13. System according to claim 9, wherein the intermediate gas outlet (20) is dedicated for connection to the fuel gas intake of the vessel propulsion engine, said vessel propulsion engine thus forming at least part of the second gas-fed device (103), and the gas pressure at the intermediate gas outlet is in the range of 6±1.5 bara or 16±4 bara.

14. System according to claim 9, wherein the gas intake (10) of the system is dedicated to be connected so as to receive boil-off gas originating from liquefied gas contained in at least one tank arranged on-board the vessel, said tank forming at least part of the gas source (101).

15. System according to claim 9, adapted for processing gas comprised of more than 80% in-weight of methane.

16. Gas-fuelled vessel, comprising a propulsion engine and at least one system for supplying compressed gas to several gas-fed devices, said system being in accordance with claim 1, wherein one among the intermediate gas outlet (20) and the end gas outlet (30) of the system is connected to a fuel gas intake of the vessel propulsion engine.

17. Gas-fuelled vessel according to claim 16, comprising two of said systems for supplying compressed gas to several gas-fed devices, wherein one among the intermediate gas outlet (20) and the end gas outlet (30) of each system is connected to the fuel gas intake of the vessel propulsion engine, so as to provide redundancy for fuel gas supply to the propulsion engine.

* * * * *